United States Patent [19]

Suzuki et al.

[11] 4,148,552
[45] Apr. 10, 1979

[54] MICROSCOPE ADAPTABLE TO VARIOUS OBSERVING METHODS

[75] Inventors: Hiroshi Suzuki, Fujisawa; Megumu Shio, Kamakura, both of Japan

[73] Assignee: Nippon Kogaku K.K., Tokyo, Japan

[21] Appl. No.: 735,522

[22] Filed: Oct. 26, 1976

[30] Foreign Application Priority Data

Oct. 28, 1975 [JP] Japan .......................... 50-146054[U]

[51] Int. Cl.² .................................................. G02B 21/06
[52] U.S. Cl. ........................................ 350/87; 350/34; 350/91
[58] Field of Search ................... 350/33, 34, 87, 91, 350/235, 236, 237, 238

[56] References Cited

U.S. PATENT DOCUMENTS

| 2,146,506 | 2/1939 | Maisch | 350/87 UX |
| 3,551,019 | 12/1970 | Michel | 350/87 X |
| 3,798,435 | 3/1974 | Schindl | 350/87 X |
| 4,008,946 | 2/1977 | Tsuda et al. | 350/33 X |

Primary Examiner—John K. Corbin
Assistant Examiner—Matthew W. Koren
Attorney, Agent, or Firm—Shapiro and Shapiro

[57] ABSTRACT

A microscope according to the present invention is a mechanically durable and highly adaptable one featured by an interchangeable arm portion and various light sources detachably provided in the arm portion as in the conventional pan-purpose microscope and also in the base portion, and thus rendered adaptable to various observing methods by suitably selecting the light sources according to the purposes of observation.

14 Claims, 5 Drawing Figures

MICROSCOPE ADAPTABLE TO VARIOUS OBSERVING METHODS

BACKGROUND OF THE INVENTION

1. Field of the Invention

This invention relates to a microscope with an interchangeable arm portion featured by various light sources detachably provided in said arm portion and base portion, and thus rendered adaptable to various observing method by suitably selecting said light sources according to the purpose of use.

2. Description of the Prior Art

The methods of observation under microscope can be generally divided into bright field microscopy with transmitted light, fluorescence microscopy with transmitted light excitation, interference, bright field microscopy with incident light, dark field microscopy with incident light, fluorescence microscopy with incident light excitation, microphotometry microscopy, phase contrast microscopy, polarized light microscopy, etc. In most cases, each observation has been achieved by a microscope specifically designed for each method of observation. Such microscope is disadvantageous in poor adaptability to other methods of observation and also in poor economic efficiency, though it is generally mechanically durable and is easily manipulatable. Also there is already known a so-called pan-purpose microscope provided with an interchangeable arm or with various attachments necessary for various observing methods, in order to improve the adaptability and economic efficiency. Such conventional pan-purpose microscope, however, has been more or less limited in performance and has been unable to satisfy the requirements of every observing method in one microscope, although it is superior to specific-purpose microscopes in economic efficiency and adaptability. Also such conventional pan-purpose microscope has often been defective in mechanical durability and manipulatability and has therefore has a room for improvement.

SUMMARY OF THE INVENTION

The prime object of the present invention is to provide a mechanically durable and highly adaptable microscope featured by an interchangeable arm portion and various light sources detachably provided in said arm portion as in the conventional pan-purpose microscope and also in the base portion, and thus rendered adaptable to various observing methods by suitably selecting said light sources according to the purpose of observation.

BRIEF DESCRIPTION OF THE DRAWINGS

The present invention will be explained in detail with respect to an embodiment thereof, while referring to the attached drawings.

DESCRIPTION OF THE PREFERRED EMBODIMENT

Figure 1:
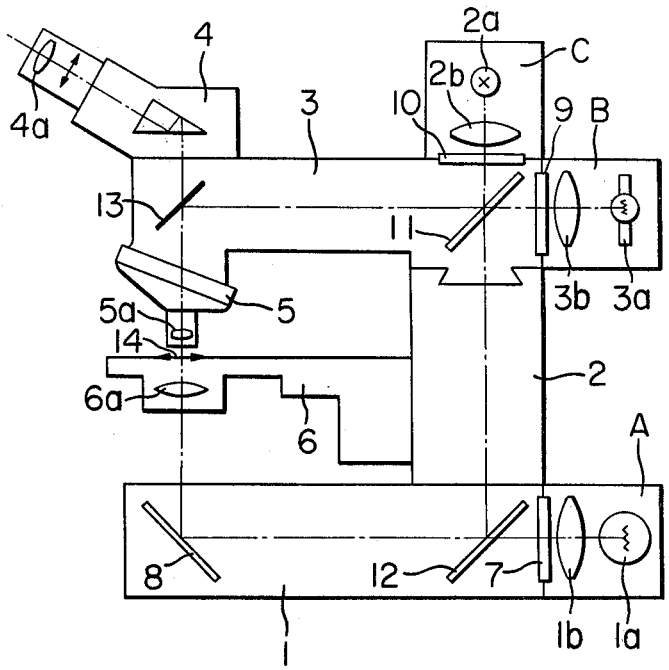
FIG. 1 is a schematic drawing indicating the fundamental structure of the microscope of the present invention.

Now referring to FIG. 1 indicating the fundamental structure of the microscope of the present invention, the reference numeral 1 denotes a base portion of microscope, 2 is a stand portion connected with said base portion 1 in one united body, and 3 is an arm portion interchangeably mounted to said stand portion 2. Said arm portion 3 is provided with an observing optical system 4 comprising an eyepiece part 42 and an objective optical system 5 comprising a lens part 5. Also said stand portion 2 is provided with a vertically movable stage 6. On the base portion 1 there is detachably mounted, through a mounting 7, a light source A which is composed of a united combination of for example a tungsten lamp 1a and a condenser lens 1b. Said mounting 7 can be composed for example of a dovetail and corresponding groove or a screw. Also the interior of said base portion 1 is so structured as to permit the passage of light from the lamp 1a of the light source A for transmission illumination of the specimen 14, and there is provided a mirror 8 to convert the direction of light beam from the lamp 1a toward said specimen 14. The arm portion 3 is interchangeably coupled with said stand portion 2 by means for example of a dovetail and a corresponding groove, as shown in FIG. 1. The stand portion 2 is internally structured, as in said base portion 1, so as to permit passage of illuminating light therethrough. The arm portion 3 is detachably provided with a light source B and a light source C respectively on the extension of optical axis of said arm portion 3 and on the extension of optical axis of said stand portion 2, respectively through mountings 9, 10 identical to the mounting 7 provided on said base portion 1. The light source B or C is composed of a united combination of a light source lamp 2a and 3a and a condenser lens as in the light source A but is different therefrom in that the light source lamp 2a or 3a is different from the lamp 1a in the light source A. For example, the lamp 3a can be a high intensity lamp such as an extra high pressure mercury lamp while the lamp 2a can be an electronic flash lamp or the like. Further, the arm portion 3 is internally structured, as in the base portion 1, so as to permit passage of the light from the light sources B and C. The numeral 11 is a reflecting member provided at the crossing point of the optical axes of the light sources B and C, and can be composed of a total reflection mirror, a half mirror, a double-sided mirror or a dichroic mirror. Said reflecting member 11 is rendered insertable into and retractable from the optical axes of said light sources B, C by means of an externally operative sliding or rotating device. Also at the crossing point of the optical axes of said stand portion 2 and the base portion 1 there is provided a reflecting member 12 which can likewise be composed of a total reflection mirror, a half mirror, a dichroic mirror, etc. and structured, similar to the reflecting member 11, to be insertable into and retractable from said optical axes by means of an externally operative sliding or rotating device. 4a is an eyepiece lens provided in said eyepiece lens portion 4, 5a is an objective lens provided in said objective lens part 5, 6a is a condenser lens provided on said stage 6, 13 is a half mirror in the arm portion 3 between said eyepiece part 4 and said objective lens part 5. The specimen 14 is placed on said stage 6.

The microscope of the present invention thus structured can be utilized in ordinary bright field observation in transmitted light in the following manner. By switching on the lamp 1a in the light source A provided in the base portion 1 and by retracting the reflecting member 12 from the optical path, the light from the lamp 1a is concentrated by the condenser lens 1b then deflected by the mirror 8 toward the specimen 14 and focused by the condenser lens 6a to illuminate the specimen 14. The image of thus illuminated specimen 14 is formed by the objective lens 5a and is observed through the eyepiece lens 4a. In this case, a lamp capable of covering entire visible wavelength range, such as a tungsten lamp or a halogen lamp, is employed in the light source A, and the lamps 3a, 2a in the light sources B, C are maintained in extinguished state.

In case of an observation requiring a light source of a higher intensity than with the aforementioned lamp 1a, such as in fluorescence microscopy, phase contrast microscopy or polarized light microscopy, the reflecting member 11 is externally adjusted or selected so as to function as a total reflection mirror for deflecting the light from the lamp 3a to the interior of stand portion 2. Also the reflecting member 12 likewise adjusted or selected so as to function as a total reflection mirror for deflecting the light guided through said stand portion 2 by said reflecting member 11 toward the interior of the base portion 1. In this manner, the light coming from the high intensity lamp 3a of the light source B is concentrated by the condenser lens 3b, then passes the interior of the stand portion 2 after being deflected by the reflecting member 11 and the interior of the base portion 1 after being further deflected by the reflecting member 12, and illuminates the specimen 14 after being deflected by the mirror 8 in the manner described before. The phase contrast microscopy is often utilized for the observation of live specimens which are apt to be killed by a strong light, particularly a strong light containing infrared ray. Consequently the use of a high intensity light source is not desirable for the observation of live specimens. On the other hand, a weak light not containing infrared ray is too dark for photographing or gives a blurred image due to the movement of live specimens in a prolonged exposure. In such case the optimum light source is an electronic flash which gives a satisfactorily strong light of a short duration with reduced amount of infrared ray. In such case, therefore, the specimen can be illuminated under optimum condition by retracting the reflecting member 11 from the light path and firing the lamp 2a in the light source C.

The observation through the interchangeable arm portion 3 can be achieved in the following manner. By retracting the reflecting member 11 from the light path and by switching on the lamp 3a, the light from said lamp 3a passes through said arm portion 3 after being concentrated by the condenser lens 3b and deflected by the half mirror 13 toward the objective lens 5a to illuminate the specimen 14, whereby achieving a bright field observation under incident light illumination. As the half mirror 13 used in such observation is not required in the aforementioned observation under transmitted light illumination, it is preferably structured retractable from the light path of objective lens 5a by means of a known method. Also the incident light illumination of the specimen 14 by the lamp 2a can also be easily achieved by inserting the reflecting member 11 as a mirror.

Furthermore it is possible to simultaneously achieve incident light and transmitted light illuminations by means of a single light source, for example light source B. In this case the reflecting members 11 and 12 are inserted into the light path respectively as a half mirror and a total reflection mirror. In this manner the light from the lamp 3a is divided, by means of said half mirror 11, so as to partially proceed along the arm portion 3 and partially along the stand portion 2.

It has thus far been explained that various observing methods are rendered possible by suitable selection of three different light sources A, B and C provided in the base portion and the arm portion and by suitable selection of reflecting members 11 and 12, but a still wider range of observing methods are in fact rendered available due to the interchangeability of the arm portion and also due to the use of a common mounting for three light sources. Examples of such available combinations are illustrated in FIGS. 2 to 5.

Figure 2:
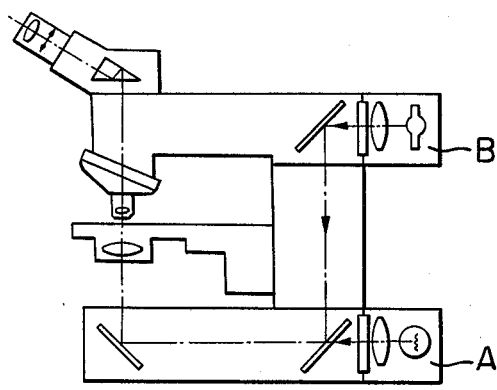
FIGS. 2 to 5 illustrate the examples of combinations of arm portion and light sources according to the purpose of observation.
Figure 4:
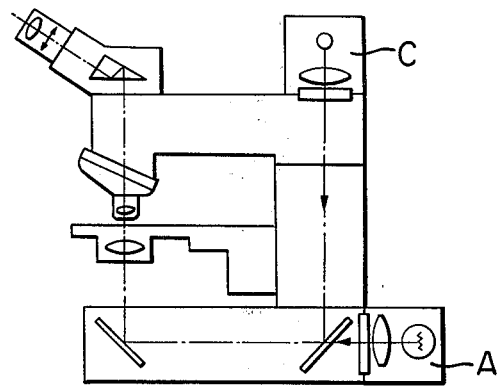
Figure 3:
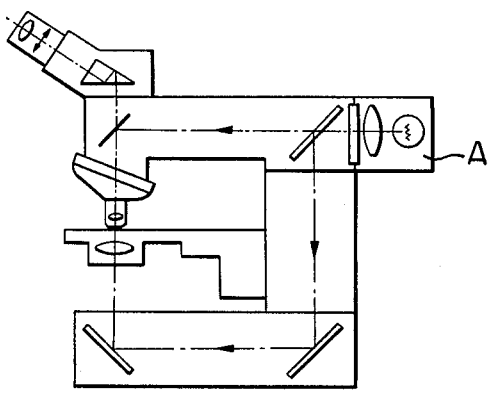
Figure 5:
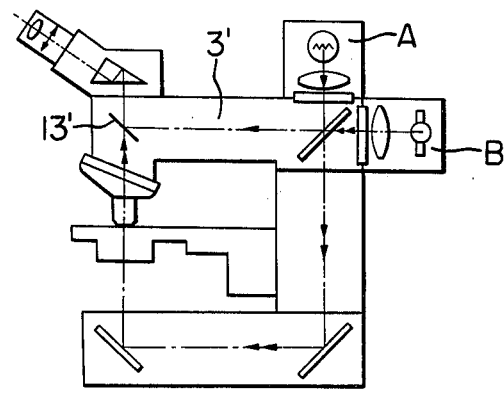

FIG. 2 shows a combination of bright field microscopy with transmitted light and fluorescence microscopy with transmitted light. In this case, the lamp 1a of the light source A is a tungsten lamp while the lamp 3a of the light source B is an extra high pressure mercury lamp, and the reflecting member of the arm portion 3 is a total reflection mirror. The reflecting member 12 in the base portion is a side-by-side arrangement of a dichroic mirror and a total reflection mirror so as to be arbitrarily selectable. In FIG. 3 there is achieved a bright field microscopy with transmitted light and incident light illuminations with a single light source A, which is particularly suitable for the observation of IC mask originals. In this case, said light source B is replaced by the light source A provided with a tungsten lamp or a halogen lamp 1a. The reflecting members 11 and 12 are respectively a half mirror and a total reflection mirror. Also in this case ordinary microscopy with incident light is achieved by retracting the reflecting member 11 from the light path, and is suitable for the observation of metals. Simultaneous transmission and reflection illuminations with a single light source, which have been unavailable in the conventional microscopes with interchangeable arm portion, are now rendered possible by the present invention due to the presence of light sources in the arm portion. FIG. 4 shows an example of ordinary bright field microscopy with transmitted light wherein the specimen is at first observed with the light source A and is then photographed with the light source C provided with an electronic flash lamp. Also FIG. 5 shows the use of an alternative arm portion 3' containing an optical system for superposing photographing data, symbols, names and the like onto the photograph when the specimen is photographed. In this case said data are illuminated by the light source A or C, which supplies light directly to the camera through a half mirror 13'. Such method of use, which has been unavailable in the conventional microscopes, is now made possible due to the presence of a light source in the arm portion.

It will be readily understood that further wider range of combinations is possible in the microscope of the present invention.

As explained heretofore, the present invention featured by the presence of an interchangeable arm portion and of various detachable light sources which can be mounted on said arm portion or on base portion through a common mounting, enables a wide variety of observing methods and is thus capable of providing a microscope of excellent durability and economic efficiency. Also the microscope of the present invention is practically valuable as it can easily accommodate various requirements of a single user.

We claim:

1. In a microscope comprising a base portion, a stand portion, an arm portion, an observing optical system and an objective optical system, each having a light path therethrough along an optical axis, one end of said arm portion connected with the observing optical system and with the objective optical system so that the light paths thereof cross each other, the opposite end of said arm portion being interchangeably connected with one end of said stand portion so that the optical axes thereof cross each other, and the opposite end of said stand portion being connected with one end of said base portion so that the optical axes thereof cross each other, the improvement comprising:

a first engaging means at said opposite end of said interchangeable arm portion and at an extension of the optical axis thereof;

first light source means having an engaging portion detachably connected to said first engaging means;

a first reflecting member at the crossing point of the optical axes of said arm portion and of said stand portion for guiding the light from said first light source means, and means for removably mounting said first reflecting member;

a second reflecting member at the crossing point of the optical axes of said stand portion and of said base portion for guiding the light from the first light source means along the optical axis of said base portion; and a third reflecting member at the opposite end of said base portion for deflecting the light guided by said second reflecting member toward said objective optical system as transmission illuminating light, and means for removably mounting said third reflecting member.

2. In a microscope according to claim 1, further comprising:

a second engaging means provided at said opposite end of said interchangeable arm portion and at an extension of the optical axis of said stand portion, the second engaging means and said first engaging means being substantially identical; and a second light source means having an engaging portion detachably connected to said second engaging means, whereby said first and second light source means are interchangeable with said first and second engaging means.

3. In a microscope according to claim 2, further comprising:

a third engaging means provided on said base portion and on an extension of the optical axis thereof and having a structure substantially identical with said first and second engaging means; and a third light source means having an engaging portion detachably connected to said third engaging means, whereby said first, second and third light source means are made interchangeable with said first, second and third engaging means.

4. In a microscope according to claim 3, further comprising a fourth reflecting member at the crossing point of the optical axes of said arm portion and of said objective optical system for deflecting the light guided along the optical axis of said arm portion toward the objective optical system as a reflection illuminating light.

5. In a microscope according to claim 2, further comprising a fourth reflecting member at the crossing point of the optical axes of said arm portion and of said objective optical system for deflecting the light guided along the optical axis of said arm portion toward the objective optical system as a reflection illuminating light.

6. In a microscope according to claim 5, wherein said first reflecting member is a total reflection mirror.

7. In a microscope according to claim 5, wherein said first reflecting member is a half mirror.

8. In a microscope according to claim 5, wherein said first reflecting member is a double-sided mirror.

9. In a microscope according to claim 2, further comprising a fifth reflecting member provided at the crossing point of the optical axes of said arm portion and of said observation optical system for deflecting the light guided along the optical axis of said arm portion by said first reflecting member toward said observing optical system as a reference illumination.

10. In a microscope according to claim 1, further comprising:

a second engaging means provided on said base portion and on an extension of the optical axis thereof, the second engaging means and said first engaging means being substantially identical; and a second light source means having an engaging portion detachably connected to said second engaging means, whereby said first and second light source means are interchangeable with said first and second engaging means.

11. In a microscope according to claim 10, further comprising a fourth reflecting member at the crossing point of the optical axes of said arm portion and of said objective optical system for deflecting the light guided along the optical axis of said arm portion toward the objective optical system as a reflection illuminating light.

12. In a microscope according to claim 11, wherein said second reflecting member is a half mirror.

13. In a microscope according to claim 1, further comprising a fourth reflecting member at the crossing point of the optical axes of said arm portion and of said objective optical system for deflecting the light guided along the optical axes of said arm portion toward the objective optical system as a reflection illuminating light.

14. In a microscope comprising a base portion, a stand portion, an arm portion, an observing optical system and an objective optical system each having a light path therethrough along an optical axis, one end of said arm portion connected with the observing optical system and with the objective optical system so that the light paths thereof cross each other, the opposite end of said arm portion being interchangeably connected with one end of said stand portion so that the optical axes thereof cross each other, and the opposite end of said stand portion being connected with one end of said base portion so that the optical axes thereof cross each other, the improvement comprising:

a first engaging means at said opposite end of said interchangeable arm portion and at an extension of the optical axis of said stand portion;

a second engaging means on said base portion and on an extension of the optical axis thereof, the second means having a structure substantially identical with said first engaging means;

a first light source means having an engaging portion detachably connected to said first engaging means;

a second light source means having an engaging portion detachably connected to said second engaging means;

a first reflecting member at the crossing point of the optical axes of said stand portion and of said base portion for guiding the light from said first light source means along the optical axis of said base portion; and a second reflecting member provided on the other end of said base portion for deflecting the light guided by said first reflecting member toward said objective optical system as transmission illuminating light, whereby said first and second light source means are made interchangeable with said first and second engaging means, and means for mounting said second reflecting member in a slanted position on the optical axis of said base portion.

* * * * *